July 29, 1969  G. M. GARVEY  3,458,003
CUTOFF SIGNAL MECHANISM FOR SCALES
Filed Aug. 1, 1966

INVENTOR
Gary M. Garvey

BY
Hovey, Schmidt, Johnson & Hovey
ATTORNEYS.

United States Patent Office 3,458,003
Patented July 29, 1969

3,458,003
CUTOFF SIGNAL MECHANISM FOR SCALES
Gary M. Garvey, Webb City, Mo., assignor to Cardinal Scale Manufacturing Co., Webb City, Mo., a corporation of Missouri
Filed Aug. 1, 1966, Ser. No. 571,166
Int. Cl. G01g 13/04
U.S. Cl. 177—116                                      3 Claims

ABSTRACT OF THE DISCLOSURE

For the purpose of initiating a cutoff signal, a light-blocking member is carried by the swingable pointer of an over-under indicator which forms a part of a scale mechanism. The member is of arcuate configuration and describes the arc of an imaginary circle having its center at a point on the axis of movement of the pointer. A light-emitting element and a photosensitive element are disposed inside and outside the circle respectively so that a change-of-state of the photosensitive element will be produced as the member moves into or out of light-blocking relationship between the elements.

---

This invention relates to a photoelectric, cutoff signal producing device for use in conjunction with scales.

In various industries scales are employed for the weighing of bulk materials, and weighing for batching, proportioning, compounding, charging, filling and processing. It is frequently desired to provide fully automatic weighing systems wherein the flow of each ingredient into a weighing vessel is controlled by the scale without operator attention. This requires that a cutoff signal be generated in response to the attaining of a predetermined, desired material weight in the vessel, such signal being utilized to initiate the operation of control apparatus which terminates the loading of the vessel.

Heretofore, the movable pointer of the scale indicator has commonly been utilized to initiate the cutoff signal through the medium of electromechanical mechanism operated by the pointer. This frequently involves physical contact between the moving parts of the indicator and the cutoff mechanism and, therefore, the possibility of introducing an error into the indicator reading exists due to the effects of friction and magnetic attraction.

It is, therefore, the primary object of this invention to provide a cutoff signal producing device which operates in response to the scale indication, but which, in no way, affects the reading of the indicator.

As a corollary to the foregoing object, it is an important aim of this invention to provide a cutoff device which cannot introduce frictional forces into the scale mechanism or cause an erroneous reading to be produced by magnetic interaction with the scale mechanism components.

Further, a specific object of the instant invention is to provide a cutoff signal producing device which monitors the position of the indicator pointer by photoelectric means and initiates the cutoff signal in response to a change-of-state of a photosensitive element.

Additionally, it is an object to provide a cutoff device as aforesaid wherein the state of a photosensitive element is controlled by a stationary light source and a light blocking member carried by the indicator pointer, the relative positions of the components of the photoelectric system being adjustable to permit the cutoff signal weight condition to be set as desired.

Figure 2:
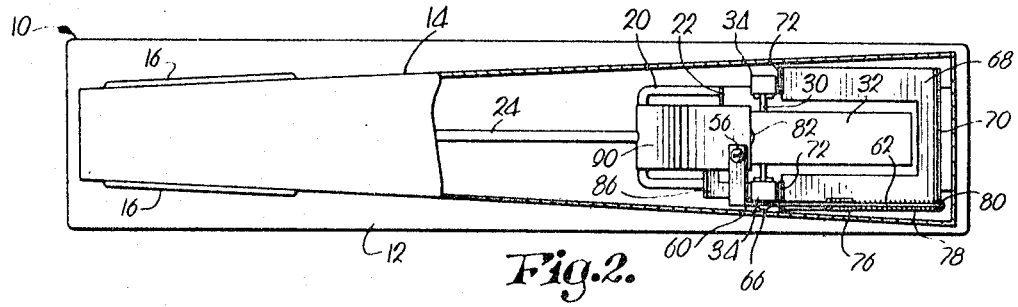
FIG. 2 is a plan view of the scale indicator, a portion of the housing being broken away as aforesaid.

The numeral 10 designates an over-under indicator having a base 12 and a housing or casing 14 provided with a pair of opposed windows 16 through which a chart 18 in housing 14 is visible. Windows 16 are provided with transparent panes so that housing 14 comprises a completely sealed unit.

Mounting structure 20 within housing 14 at the right end thereof presents an inclined platform 22 which supports the parts of the pointer assembly and cutoff device. The pointer itself is shown at 24 and, in full line, is illustrated in registration with a balance mark 26 on chart 18. The pointer assembly is conventional in construction, pointer 24 being on a pair of spaced bearings (not shown in detail) supported by respective posts 28 extending upwardly from platform 22. T pair of opposed knife blades 30 extend transversely outwardly from pointer 24 and present lower edges which are received in notches in the bearings and define the axis of swinging movement of the pointer. A counterweight 32 forms a part of pointer 24 and biases the latter by gravity in a clockwise direction about the axis of movement of the pointer as viewed in FIG. 1. A pair of bearing housings 34 partially surround posts 28 and the extremities of blades 30 and serve as protective covers.

Figure 4:
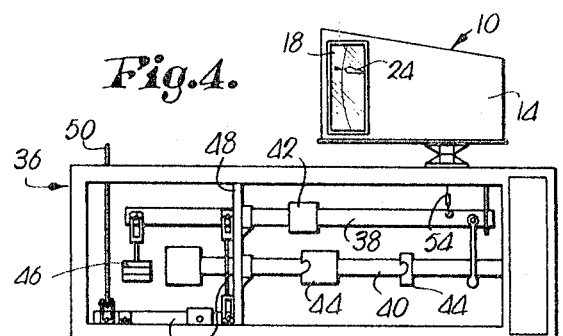
FIG. 4 is a front view of the indicator and its associated beam box.

Indicator 10 is shown in FIG. 4 in association with a batching beam box 36 of conventional design which houses a blank balancing beam 38 and a graduated ingredient beam 40. A sliding poise 42 controls the weight setting of beam 38, a pair of poises 44 being illustrated in association with beam 40. Back-balance weights 46 depend from the left end of beam 38, the latter being pivotally carried by an upright support 48. A draft rod 50 is coupled with beam 38 by linkage structure 52 in a manner such that an upward, longitudinal force applied to rod 50 pulls downwardly on the portion of beam 38 on the left side of support 48 to, in turn, raise the right-hand end of the beam.

Figure 1:
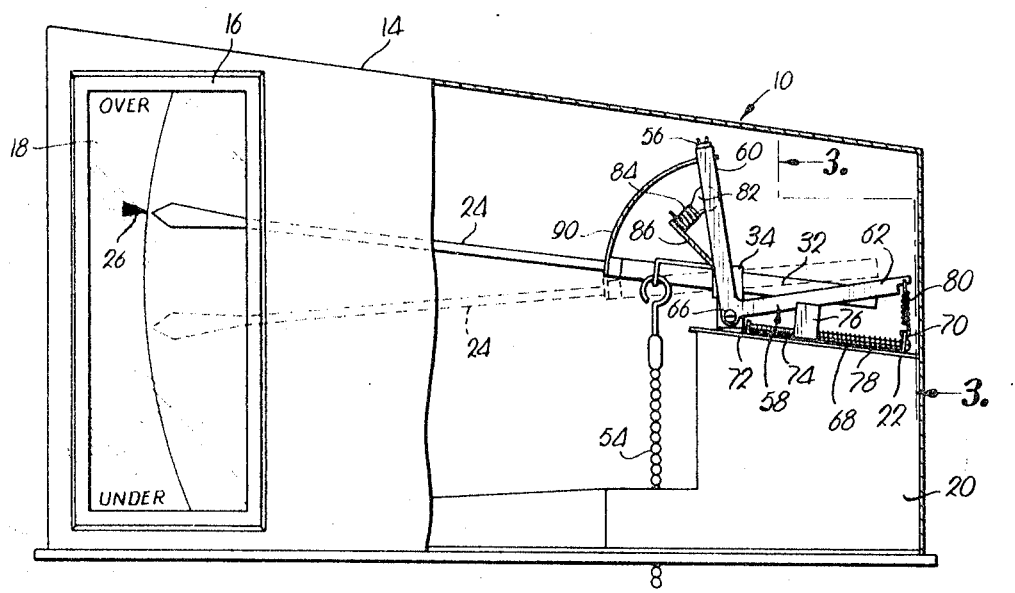
FIGURE 1 is a front elevational view of the scale indicator, a portion of the housing being broken away to reveal the indicator mechanism and cutoff device therewithin.

In comparing FIGS. 1 and 4, it may be seen that a chain 54 depends from pointer 24 through an opening (not shown) in base 12 and into beam box 36 where the lower end of the chain is connected to beam 38 adjacent the right end thereof. It should be understood that, in use, draft rod 50 would be connected to a suspension hopper or other receptacle which exerts a pull on rod 50 in proportion to the weight of material loaded thereinto. Thus, at the commencement of the weighing operation with the vessel empty, the right-hand end of beam 38 is in its lowermost position and thereby exerts a downward pull on chain 54. This swings pointer 24 in a counterclockwise direction to register an "under" condition on chart 18. As material is loaded into the hopper, the pull on rod 50 gradually raises the right end of beam 38 to permit pointer 24 to swing in a clockwise direction under the influence of counterweight 32.

When pointer 24 is in the position illustrated by full lines, registration with mark 26 indicates that a balanced condition exists, i.e., the force on draft rod 50 offsets the setting of the weights associated with beam 38 and balances the beam. Normally, the balanced condition corresponds to the loading of the desired weight of material into the vessel. Therefore, in an automatic material cutoff control system, it is necessary to initiate the material flow control apparatus as pointer 24 approaches mark 26 or is exactly aligned therewith, depending upon the response of the system.

Figure 3:
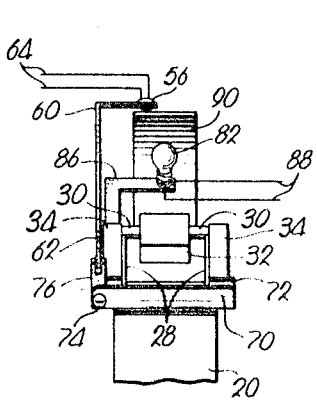
FIG. 3 is a sectional detail taken along line 3—3 of FIG. 1.

In the instant invention, a photosensitive element 56 is employed to produce the cutoff signal utilized by control circuitry (not shown) which operates the material flow control apparatus. Element 56 may be of the voltaic or photoconductive type and is mounted on a frame broadly denoted 58 which includes a V-shaped section (FIG. 1) having an upwardly extending arm 60 and a generally horizontally extending arm 62. Element 56 is carried by the upper end of arm 60, the latter being of inverted, L-shaped configuration as shown in FIG. 3. A pair of leads 64 connect element 56 with the aforementioned control circuitry.

Frame 58 is adjustable and is secured to one of the bearing support posts 28 by a screw 66 which forms a pivot for the frame and permits movement thereof about an axis closely spaced from and parallel to the axis of movement of pointer 24. Screw 66 is located at the apex of the V-shaped section formed by arms 60 and 62 and is spaced just above platform 22.

A U-shaped plate 68 (FIG. 2) overlies a portion of platform 22 and has an upturned flange 70 along the margin of its bight portion, the legs of plate 68 being provided with upturned ears 72 at their extremities. An adjustment screw 74 spans one of the ears 72 and flange 70 at one edge of palte 68 and is rotatably carried thereby. A component 76 in the form of a shiftable block is threaded onto screw 74 and rides over the surface of plate 68 as the screw is rotated. A spring 78 is telescoped over screw 74 and is in compression between components 76 and flange 70. Component 76 is notched as is clear in FIG. 3 and receives arm 62 within the notch, the arm being held in engagement with component 76 by a tension spring 80 interconnecting the tip of arm 62 and flange 70.

A light-emitting element 82 in the form of a small gas-filled or incandescent bulb is received in a socket 84 rigidly secured to an L-shaped mounting bracket 86 fixed at its lower end to the bearing housing 34 proximal to arm 60. Socket 84 is connected to a suitable source of electrical current by a pair of leads 88. Bracket 86 mounts lamp 82 substantially in the plane of movement of pointer 24 and in closer radially spaced relationship to the axis of movement of pointer 24 than element 56.

An elongated, arcuate, plate-like cutoff member 90 is secured to pointer 24 at its lower end and extends along an arc of an imaginary circle having its center at the axis of movement of pointer 24. In the full-line position of pointer 24, it will be appreciated that the upper extremity of member 90 is disposed between lamp 82 and the photosensitive element 56 and that, therefore, a shadow is cast across element 56. In the broken-line position of pointer 24, however, illustrated in FIG. 1, the upper extremity of member 90 is out of light-blocking relationship to the light rays from lamp 82 impinging upon element 56.

In operation, pointer 24 will initially be in its lowermost position indicating an "under" weight condition as the hopper or other receptacle begins to fill. In this initial position, the photosensitive element 56 is exposed to the rays from lamp 82 and, in the case of a photoconductor, will present a low resistance between leads 64 which is sensed by the material flow control circuitry. As the weigh of the material in the hopper increases and pointer 24 is permitted to swing upwardly by the rising of the right-hand end of beam 38, a position will ultimately be reached where the upper extremity of member 90 blocks the light rays from lamp 82 that previously impinged upon element 56. At this point, the cutoff signal is initiated by the change-of-state of element 56. If a photoconductive element is utilized, this change is from a low to a high resistance appearing between leads 64 which, in turn, triggers the flow control circuitry to terminate loading of the hopper.

The position of photosensitive element 56 with respect to lamp 82 may be readily adjusted by rotating screw 74. Rotation of the screw in one direction or the other causes component 76 to shift in a corresponding direction to, in turn, raise or lower arm 62. In this manner, the exact cutoff point may be set as desired. It is also noteworthy that a second cutoff device may be secured to the other bearing support post 28 since flange 70 and an unused mounting ear 72 are provided. Thus, multiple cutoffs may be employed if needed for a particular application.

Having thus described the invention, what is claimed as new and desired to be secured by Letters Patent is:

1. In a scale for weighing material as the latter is loaded into a receptacle:
   an indicator having a movable pointer, means mounting said pointer for swinging movement from an initial position to a final position where the pointer registers a predetermined weight condition, and means coupled with said pointer for shifting the latter from said initial to said final position as the material is loaded;
   a bistate, photosensitive element adjacent said pointer for producing a material cutoff signal;
   a light-emitting element spaced from said photosensitive element for exciting the latter;
   a light blocking member carried by said pointer and movable therewith along a path of travel intercepting light rays from said light-emitting element between the latter and said photosensitive element,
   said member being disposed to maintain said photosensitive element in one state thereof when the pointer is in said initial position, and moving with the pointer to a disposition effecting a change-of-state of said photosensitive element as the pointer is shifted to said final position to thereby initiate said cutoff signal; and
   structure mounting said photosensitive and light-emitting elements in radially spaced relationship to the axis of movement of said pointer and at different distances therefrom, and including a frame supporting one of said photosensitive and light-emitting elements, a pivot mounting said frame adjacent said axis, and adjustable means engaging said frame for shifting the latter about said pivot to a selected location, whereby to permit selective positioning of said one element in accordance with the weight condition at which said signal is to be initiated.

2. The invention of claim 1,
   said frame having a generally V-shaped section presenting a pair of arms,
   one of said arms carrying said one element,
   said pivot being disposed at the apex of said section,
   said adjustable means including an elongated adjustment screw extending away from said pivot in diverging relationship to the other of said arms, a component threaded on said screw, and yieldable means coupled with said other arm and biasing the latter into engagement with said component.

3. In a scale for weighing material as the latter is loaded into a receptacle:
   an indicator having a movable pointer, means mounting said pointer for swinging movement from an initial position to a final position where the pointer registers a predetermined weight condition, and means coupled with said pointer for shifting the latter from said initial to said final position as the material is loaded;
   a bistate, photosensitive element adjacent said pointer for producing a material cutoff signal;
   a light-emitting element spaced from said photosensitive eiement for exciting the latter;
   a light blocking member of elongated, longitudinally arcuate configuration and describing an arc of an imaginary circle having its center at a point on the axis of movement of said pointer; and
   structure mounting said photosensitive and light-emitting elements in radially spaced relationship to said axis and at different distances therefrom inside and outside said circle, said member being carried by said pointer and movable therewith in a path of travel extending along said circle and intercepting light rays from said light-emitting element between the latter and said photosensitive element, said member being disposed to maintain said photosensitive element in one state thereof when the pointer is in said initial position, and moving with the pointer to a disposition effecting a change-of-state of said photosensitive element as the pointer is shifted to said final position to thereby initiate said cutoff signal.

References Cited

UNITED STATES PATENTS

| 3,093,203 | 6/1963 | Frost | 177—47 X |
| 3,131,780 | 5/1964 | Yarborough | 177—46 |
| 3,148,742 | 9/1964 | Gulie | 177—46 |
| 3,189,110 | 6/1965 | Yarborough | 177—46 X |

RICHARD B. WILKINSON, Primary Examiner

GEORGE H. MILLER, Jr., Assistant Examiner

U.S. Cl. X.R.

177—164, 173